US011938796B2

(12) United States Patent
Clarke et al.

(10) Patent No.: US 11,938,796 B2
(45) Date of Patent: Mar. 26, 2024

(54) VEHICLE WITH EXOSKELETON

(71) Applicant: Tesla, Inc., Austin, TX (US)

(72) Inventors: Alan Paul Clarke, Long Beach, CA (US); Xiaoping Cai, San Francisco, CA (US); Lars Moravy, Oakland, CA (US); Ted Antony, Playa Del Rey, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 16/953,036

(22) Filed: Nov. 19, 2020

(65) Prior Publication Data

US 2021/0155292 A1 May 27, 2021

Related U.S. Application Data

(60) Provisional application No. 62/938,735, filed on Nov. 21, 2019.

(51) Int. Cl.
*B60J 5/04* (2006.01)
*B60K 1/00* (2006.01)
*B62D 21/15* (2006.01)
*B62D 23/00* (2006.01)
*B62D 29/00* (2006.01)
*B62D 65/02* (2006.01)

(52) U.S. Cl.
CPC .............. *B60J 5/0415* (2013.01); *B60J 5/045* (2013.01); *B60J 5/0463* (2013.01); *B60K 1/00* (2013.01); *B62D 21/157* (2013.01); *B62D 23/00* (2013.01); *B62D 29/00* (2013.01); *B62D 65/02* (2013.01)

(58) Field of Classification Search
CPC ..................................... B60J 5/0415
USPC ................. 296/146.5, 37.6, 146.1, 97.22
See application file for complete search history.

(56) References Cited

U.S. PATENT DOCUMENTS

| 2,134,487 | A | * | 10/1938 | Levinson | B60J 5/0476 160/180 |
| 4,766,660 | A | * | 8/1988 | La Rose | B60J 5/0476 29/401.1 |
| 4,966,510 | A | * | 10/1990 | Johnson, Jr. | B60P 3/08 410/24 |
| 6,012,754 | A | * | 1/2000 | Clare | B60J 10/00 224/404 |
| 6,412,852 | B1 | | 7/2002 | Koa et al. | |

(Continued)

FOREIGN PATENT DOCUMENTS

JP H079007 A * 1/1996

OTHER PUBLICATIONS

International Search Report and Written Opinion dated Feb. 23, 2021 in application No. PCT/US2020/051324.

(Continued)

*Primary Examiner* — Dennis H Pedder

(74) *Attorney, Agent, or Firm* — Knobbe Martens Olson & Bear, LLP

(57) ABSTRACT

A vehicle having an exoskeleton exterior panel that provides crash resistance is described. The exterior panel may be formed from a monolithic metal sheet and attached to an exterior portion of the vehicle frame, and the exterior panel does not comprise an additional support structure. At least one component may be directly attached to the exterior panel, and the exterior panel may bear the load of the at least one component. Methods of manufacturing the vehicle are also described.

20 Claims, 3 Drawing Sheets

(56) References Cited

U.S. PATENT DOCUMENTS

| | | | |
|---|---|---|---|
| 7,219,941 B1* | 5/2007 | San Paolo | B60R 9/00 |
| | | | 224/404 |
| 2001/0038219 A1* | 11/2001 | Clare | B62D 33/02 |
| | | | 296/37.6 |
| 2001/0050491 A1* | 12/2001 | Clare | F16F 9/42 |
| | | | 296/37.6 |
| 2004/0177478 A1 | 9/2004 | Louvel | |
| 2018/0162206 A1 | 6/2018 | Seong et al. | |

OTHER PUBLICATIONS

The New Oxford American Dictionary, 2001, Framework definition, Oxford University Press, Jewell et al., eds., p. 672.
Wikipedia, Vehicle frame, https://en.wikipedia.org/wiki/Vehicle_frame, downloaded Aug. 8, 2023, 10 pp.

* cited by examiner

VEHICLE WITH EXOSKELETON

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to vehicles. More specifically, the present disclosure relates to exoskeleton exterior vehicle panels that are mounted to a vehicle frame and provide crash resistance properties and may be load bearing.

Description of the Related Art

Conventional vehicles, for example automotive vehicles, generally have doors that are made from paneling assemblies that include an exterior panel, an inner panel and multiple stamped reinforcements welded to the inner panel that are then hemmed to the exterior panel. Within the paneling assemblies, such as door assemblies, an anti-intrusion bar may be includes that is generally a thick, durable, steel or aluminum bar to help protect passengers from side or rear impacts, such as by another vehicle. Because conventional exterior panels that make up conventional panel assemblies do not have much strength, the anti-intrusion bar is included to provide the crash protection.

However, such additional components that make up the panel assemblies add additional costs and time to the overall manufacturing process. In addition, they increase the assembly requirements to install and service components that are attached within such panel assemblies

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

In one aspect, a vehicle having a vehicle frame is described. The vehicle includes an exterior panel formed from a monolithic metal sheet and attached to an exterior portion of the vehicle frame, and at least one component directly attached to the exterior panel, wherein the exterior panel bears the load of the at least one component, and wherein the exterior panel does not comprise an additional support structure.

In some embodiments, the monolithic metal sheet comprises a metal selected from the group consisting of steel, aluminum, and combinations thereof. In some embodiments, the at least one component is selected from the group consisting of at least one hinge, at least one handle, at least one bolt, a motor, an interior trim panel, a windshield, and combinations thereof. In some embodiments, the additional support structure is selected from the group consisting of an additional metal panel, a support beam, a stamped reinforcement, an anti-intrusion bar, and combinations thereof.

In some embodiments, the exterior panel provides side impact protection for the vehicle. In some embodiments, an exterior surface of the exterior panel does not comprise paint. In some embodiments, the exterior panel is selected from the group consisting of a door panel, a roof panel, a hood panel, a fender panel, a trunk panel, a liftgate panel, and combinations thereof. In some embodiments, the exterior panel is the door panel. In some embodiments, the vehicle further comprises an electric motor.

In another aspect, a method of manufacturing an automotive vehicle is described. The method includes providing a monolithic metal sheet, wherein the monolithic metal sheet is manufactured comprising the steps of: providing an initial monolithic metal sheet, cutting the initial monolithic metal sheet to form a cut monolithic metal sheet and shaping the cut monolithic metal sheet to form the monolithic metal sheet; attaching at least one components directly to the monolithic metal sheet to form an exterior panel, and attaching the exterior panel to an exterior portion of a vehicle body, wherein additional support structures are not added to the exterior panel.

In some embodiments, the initial monolithic metal sheet is a rolled metal sheet. In some embodiments, the monolithic metal sheet is not heat treated. In some embodiments, the exterior panel is not joined to another metal panel. In some embodiments, cutting is performed by laser cutting.

Figure 1:
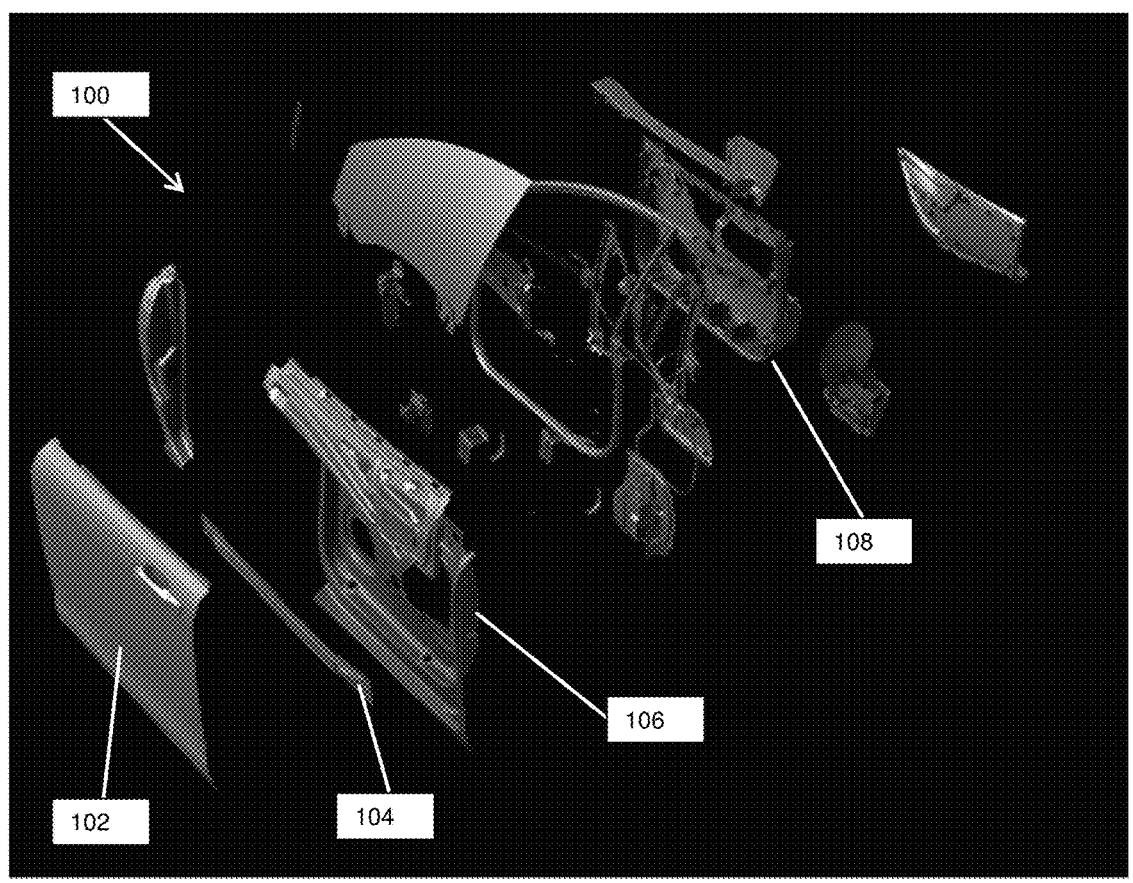
FIG. 1 shows an exploded view of the components in a conventional prior art door assembly.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure may be understood by reference to the following detailed description. It is noted that, for purposes of illustrative clarity, certain elements in various drawings may not be drawn to scale, may be represented schematically or conceptually, or otherwise may not correspond exactly to certain physical configurations of embodiments.

Embodiments relate to vehicles, and in particular to automotive vehicles (e.g. trucks and cars), that include exterior panels that provide crash resistance. In some embodiments, the exterior panels provide crash resistance similar to or greater than what may be provided by an anti-intrusion bar in a conventional vehicle. In some embodiments, an exterior panel contributes to the primary structural performance of the vehicle. For example, in some embodiments an outer door panel provides the majority of structural performance that protects against side impacts into the door area. In some embodiments, the vehicle comprises an electric motor. In one embodiment the vehicle is a truck, for example, a pickup truck having an all-electric propulsion system connected to a battery pack.

In contrast to the embodiments of the present disclosure, FIG. 1 shows an exploded view of the complexity of parts used in a conventional door 100. As can be seen, there is an outer door panel 102 that covers an anti-intrusion bar 104, where the anti-intrusion bar 104 provides resistance from side impacts to persons within the vehicle. On the inner surface of the anti-intrusion bar 104 is a mid-panel 106, which bears the load of one or more door components, and an interior trim panel 108, which is used to cover the internal workings of the door 100.

Figure 2:
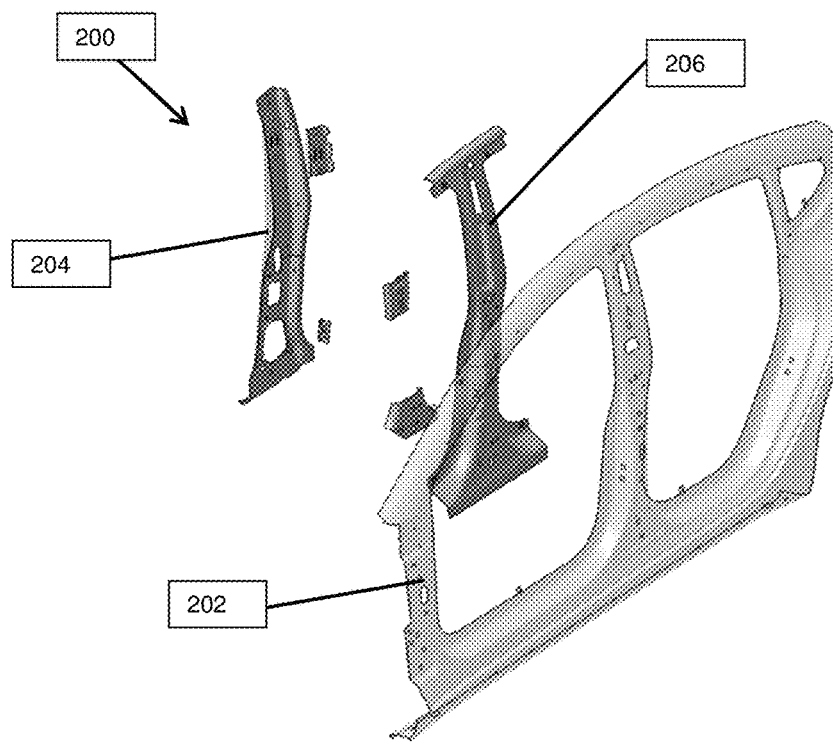
FIG. 2 shows a prior art door assembly including a conventional B-pillar assembly.

FIG. 2 shows a prior art door assembly 200 including conventional B-pillar of a vehicle that is located between or adjacent to a set of doors. As shown the external portion of the frame 202 includes two door openings. The external portion of the frame 202 mounts to an interior B-pillar support 204 and uses a set of brackets to mate with an intermediate B-pillar support 206 to form one structurally protective unit. As shown in FIGS. 1 and 2, the conventional vehicle exterior paneling requires multiple additional components in order to provide structural support, bear loads of components, and provide crash resistance properties.

Figure 3:
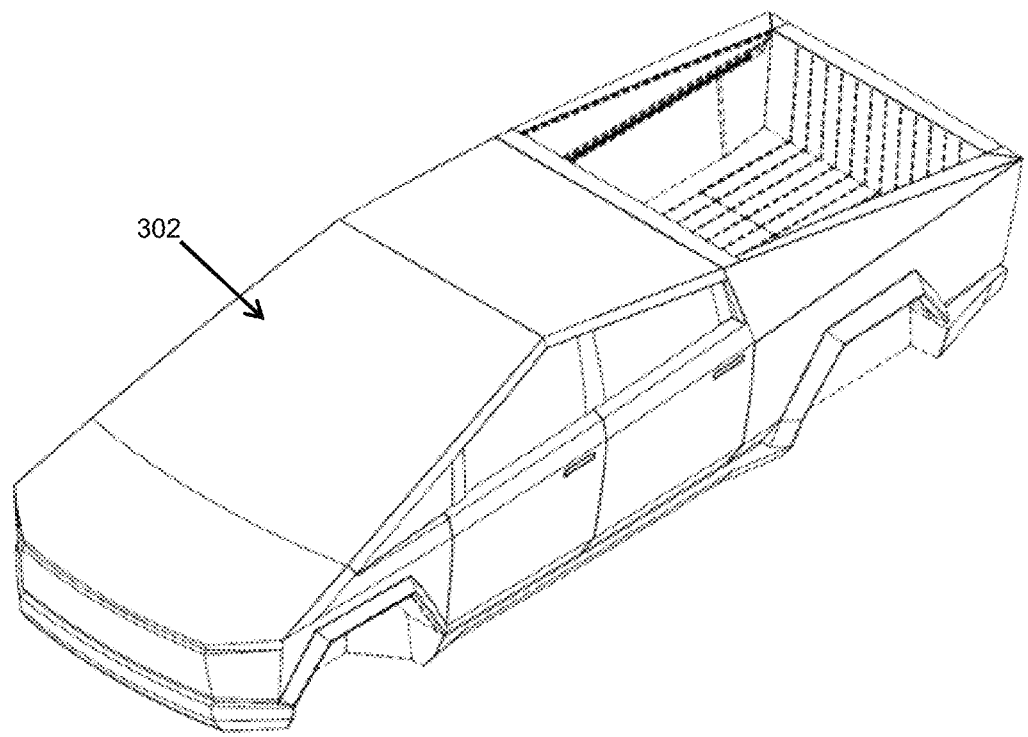
FIG. 3 is a perspective view of one embodiment of a pickup truck with an exterior panel exoskeleton.
Figure 4:
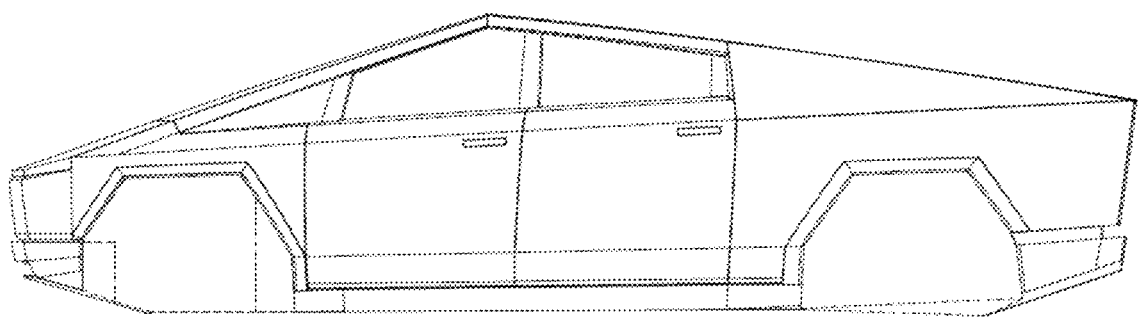
FIG. 4 is a side view of one embodiment of a pickup truck with an exterior panel exoskeleton.

Embodiments of the present disclosure relate to vehicle architectures designed such that the exterior panels of the vehicle also contribute to the vehicle's structural performance. Such exterior paneling of a vehicle may be referred to as an "exoskeleton." FIGS. 3 and 4 are views of pickup truck embodiments with exterior panel exoskeleton designs. Some embodiments of the present disclose do away with anti-intrusion bars, and instead use a durable unitary exterior panel (e.g. door panel) to provide impact protection. Thus, the exoskeleton design described herein eliminates the inner door structure and protection system, and uses only a unitary outer exterior panel. In this design, the hinges and latches for opening and closing the door, as well as door component such as windows and motors mount directly to the exterior panel. This approach may be applied to side door, roof, hood, fender, and trunk (or liftgate) assemblies of the vehicle. The exoskeleton approach may result in significant reduction in manufacturing footprint and costs. The pickup truck shown in FIG. 3 includes a windshield 302.

One example embodiment of a vehicle exoskeleton structure is a side door system that is configured to react to opening and closing loads on the door. In some embodiments, the door also withstands abuse loads for over openings, slam closures, twisting loads on the door, reaction forces for seals and reaction window operation loads, among others. In another embodiment, other externally facing portions of the vehicle would also use the exoskeleton concept. For example, in a typical conventional vehicle a welded closed vertical section between the side doors of a vehicle acts as a beam to react against side crash forces applied to the body by an impacting vehicle, resist vertical loads applied to the roof in a roll over even and react seat belt loads for the front seat passenger, among other smaller forces. In contrast, this body side structure construction would convention have a thin, cosmetic outer panel welded to a structural closed section (typically one or more inner stamped sections welded to one or more outer stamped sections). However, embodiments of the present disclosure relate to an exoskeleton construction, where the outer structural reinforcement(s) are made from a single structural panel that provide the same load advantages as the more complex conventional structure, but also serve the cosmetic functions of the customer facing areas of the vehicle.

As such, a vehicle having a vehicle frame is disclosed, wherein the vehicle comprises an exterior panel. In some embodiments, the exterior panel is attached to an exterior portion of the vehicle frame. In some embodiments, the exterior panel provides crash resistance to the vehicle due to its composition and/or structural properties. In some embodiments, the exterior panel provides side impact protection for the vehicle. In some embodiments, the exterior panel is or is formed from a monolithic metal sheet. In some embodiments, the monolithic metal sheet comprises a metal selected from the group consisting of steel, aluminum, and combinations thereof. In some embodiments, the corrosion resistance of the monolithic metal sheet allows for the exterior panel of the vehicle to be utilized without application of an anticorrosion coating (e.g. paint). In some embodiments, an exterior surface of the exterior panel does not comprise paint.

The exterior panel may provide crash resistance to the vehicle without additional support structures necessary in conventional vehicles. In some embodiments, the exterior panel does not comprise an additional support structure. In some embodiments, the additional support structure is selected from the group consisting of an additional metal panel, a support beam, a stamped reinforcement, an anti-intrusion bar, and combinations thereof.

The exterior panel may have sufficient structural support such that additional components may be attached and supported by the exterior panel. In some embodiments, at least one component is attached to the exterior panel. In some embodiments, at least one component is directly attached to the exterior panel. In some embodiments, the exterior panel bears the load or substantially bears the load of the at least one component. In some embodiments, the at least one component is selected from the group consisting of at least one hinge, at least one handle, at least one bolt, a motor, an interior trim panel, a windshield, and combinations thereof.

In some embodiments, the vehicle is an automotive vehicle. In some embodiments, the automotive vehicle is a truck or a car (e.g. sedan). In some embodiments, the exterior panel is selected from the group consisting of a door panel, a roof panel, a hood panel, a fender panel, a trunk panel, a liftgate panel, and combinations thereof. In some embodiments, the exterior panel is the door panel.

Figure 5:
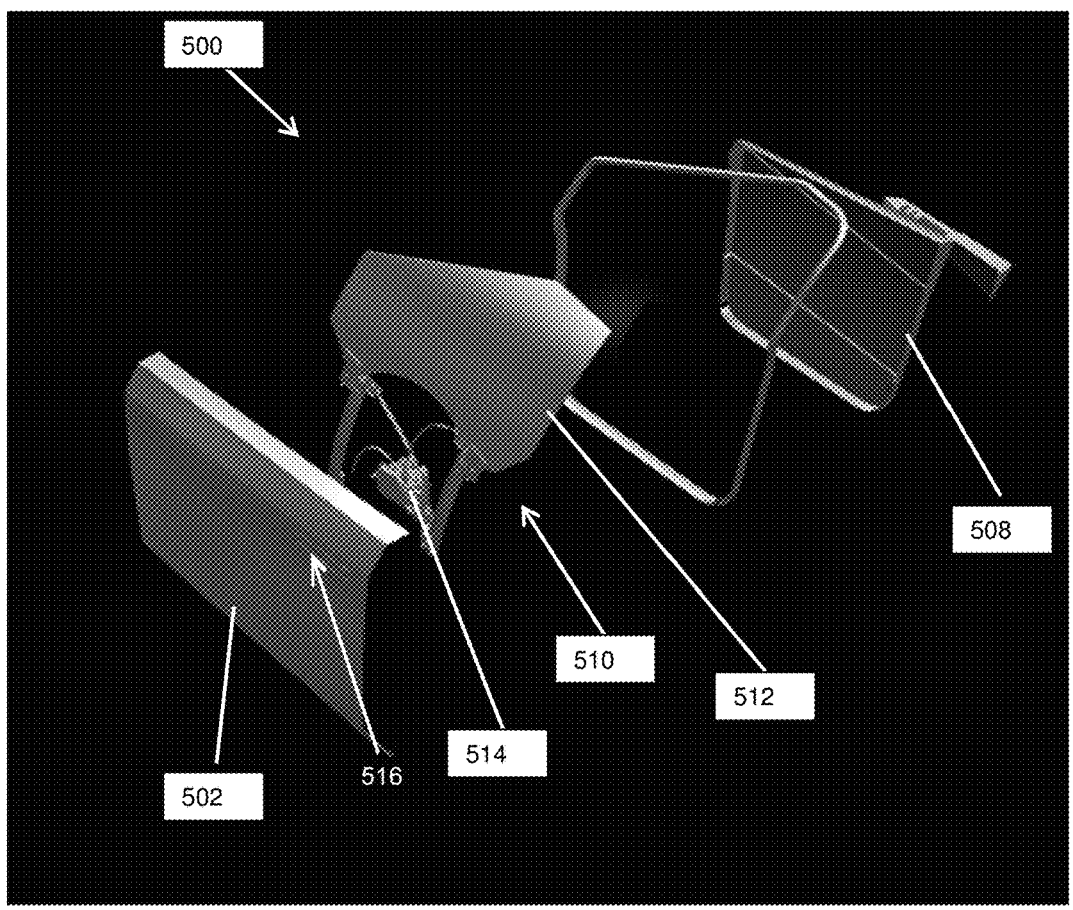
FIG. 5 shows an exploded view of one embodiment of a door with an exoskeleton exterior panel.

FIG. 5 shows an exploded view of one embodiment of a door 500 comprising an exoskeleton exterior panel 502. The exterior panel 502 is configured to mount directly to the vehicle body through a hinge (not shown). The exterior panel 502 is shown with a handle 516. Adjacent to the outer door panel is an electric window assembly 510, comprising a window 512 and a motor 514. The electric window assembly 510 is attached directly to the exterior panel 502 by an interior latch mechanism (not shown), and an interior trim panel 508 is used to cover the internal workings of the door 500. Because the exterior panel 502 is made from a durable material (e.g. steel, aluminum or other metals) there is no need for an interior anti-intrusion bar or other elements to protect the passengers from a side door strike found in conventional vehicle door assemblies like the door shown in FIG. 1, which includes additional components such as anti-intrusion bar 104 and mid-panel 106.

Figure 6:
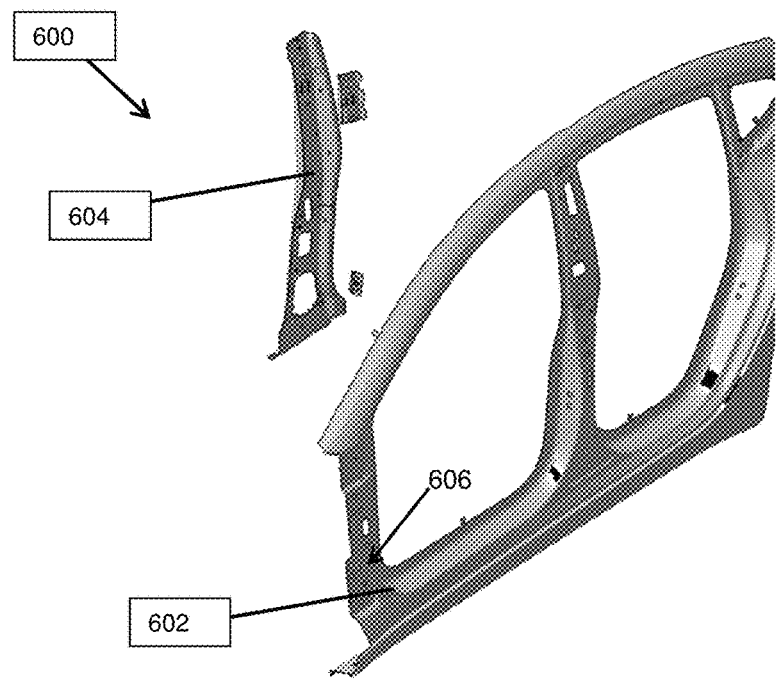
FIG. 6 shows one embodiment of a door assembly comprising an exoskeleton version of a B-pillar.

FIG. 6 shows one embodiment of a door assembly 600 comprising an exoskeleton version of a B-pillar. Door assembly 600 includes an external portion of the frame 602 including two door openings. Furthermore, the external portion of the frame 602 only requires a single interior B-pillar support 604 attached to the external portion of the frame 602 to form a structurally protective unit. The structural strength and resistance to impact of door assembly 600 is due in part to the external portion of the frame 602 that is designed and built from materials, such as aluminum or steel that provide a protective barrier from side impact collisions. Thus, door assembly 600 does not require a second B-pillar section, such as the intermediate B-pillar support 206 of FIG. 2, because the external portion of the frame 602 already includes sufficient structural support to protect the occupants from side impact collisions. The frame 602 includes an attachment area 606 (e.g., holes) where hinges or bolts can be attached to the frame 602.

Some benefits of an exoskeleton design to the manufacturing process include reduction of assembly lines required to join the various reinforcements prior to joining to the body/under body structure. In some embodiments, this concept could replace one or more framing processes wherein the body side structure is joined to the under body structure. In some embodiments, the outer panels of the vehicle could be designed in such a way as to replace both the structural inner and outer reinforcements with a single panel.

Methods of manufacturing a vehicle, such as an automotive vehicle, are also disclosed. In some embodiments, a monolithic metal sheet is provided, at least one component is attached directly to the monolithic metal sheet to form an exterior panel, and the exterior panel is attached to an exterior portion of a vehicle body. In some embodiments, additional support structures are not added to the exterior panel. In some embodiments, the exterior panel is not joined to another metal panel.

The monolithic metal sheet may be manufactured by providing an initial monolithic metal sheet, cutting the initial monolithic metal sheet to form a cut monolithic metal sheet, and shaping the cut monolithic metal sheet to form the monolithic metal sheet. In some embodiments, the monolithic metal sheet is in the shape of a door panel. In some embodiments, the monolithic metal sheet is in the shape of an external portion of a frame. In some embodiments, the initial monolithic metal sheet is a rolled metal sheet. In some embodiments, the monolithic metal sheet is not heat treated. In some embodiments, cutting is performed by laser cutting.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount, depending on the desired function or desired result.

The headings contained in this document, if any, are for convenience only and do not necessarily affect the scope or meaning of the devices and methods disclosed herein.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A vehicle, comprising:
    an internal structural vehicle framework comprising an exterior portion;
    an exterior panel formed from a monolithic metal sheet and mounted to the exterior portion of the internal structural vehicle framework directly through a joint, wherein the exterior panel acts as a support structure for at least one component; and
    the at least one component directly attached to the exterior panel,
    wherein the exterior panel is a passenger door panel,
    wherein the exterior panel bears the load of the at least one component, and
    wherein the exterior panel does not consist of an additional support structure selected from the group consisting of an additional metal panel, a support beam, a reinforcement, an anti-intrusion bar, and combinations thereof.
2. The vehicle of claim 1, wherein the monolithic metal sheet comprises a metal selected from the group consisting of steel and aluminum.
3. The vehicle of claim 1, wherein the at least one component is selected from the group consisting of a motor, an interior trim panel, and combinations thereof.
4. The vehicle of claim 1, wherein the exterior panel provides side impact protection for the vehicle.
5. The vehicle of claim 1, wherein an exterior surface of the exterior panel does not comprise paint.
6. The vehicle of claim 1, further comprising an electric motor.
7. A method of manufacturing an automotive vehicle, comprising:
    providing a monolithic metal sheet, wherein the monolithic metal sheet is manufactured comprising the steps of:
        providing an initial monolithic metal sheet;
        cutting the initial monolithic metal sheet to form a cut monolithic metal sheet; and
        shaping the cut monolithic metal sheet to form the monolithic metal sheet;
    attaching at least one component directly to the monolithic metal sheet to form an exterior panel, wherein the monolithic metal sheet bears the load of the at least one component thereby acting as a support structure; and
    mounting the exterior panel to an exterior portion of an internal structural vehicle framework directly through a joint;
    wherein the method does not consist of attaching an additional support structure to the exterior panel, the additional support structure selected from the group consisting of an additional metal panel, a support beam, a reinforcement, an anti-intrusion bar, and combinations thereof, and
    wherein the exterior panel is configured to define a passenger compartment of the vehicle.
8. The method of claim 7, wherein the initial monolithic metal sheet is a rolled metal sheet.
9. The method of claim 7, wherein the method does not comprise heat treating the monolithic metal sheet.
10. The method of claim 7, wherein the method does not consist of joining the exterior panel to another metal panel.
11. The method of claim 7, wherein cutting is performed by laser cutting.
12. The vehicle of claim 1, wherein the joint comprises a hinge, a latch, or a bolt.
13. The vehicle of claim 1, wherein the exterior panel is mounted to a pillar of the exterior portion of the internal structural vehicle framework at one end, such that the exterior panel is configured to rotate about the pillar.
14. The vehicle of claim 1, wherein the internal structural vehicle framework comprises a pillar assembly, and wherein the pillar assembly consists essentially of an interior support structure and a pillar of the exterior portion of the internal structural vehicle framework.
15. The vehicle of claim 1, wherein the internal structural vehicle framework is a unibody internal structural vehicle framework.
16. The method of claim 7, wherein the joint comprises a hinge, a latch or a bolt.
17. The method of claim 7, wherein mounting the exterior panel comprises mounting one end of the exterior panel to a pillar of the exterior portion of the internal structural vehicle framework, such that the exterior panel is configured to rotate about the pillar.
18. A vehicle, comprising:
    an internal structural vehicle framework comprising an exterior portion;
    an exterior panel formed from a monolithic metal sheet and mounted to the exterior portion of the internal structural vehicle framework directly through a joint, wherein the exterior panel acts as a support structure for at least one component; and the at least one component directly attached to the exterior panel, wherein the exterior panel bears the load of the at least one component, wherein the exterior panel does not consist of an additional support structure selected from the group consisting of an additional metal panel, a support beam, a reinforcement, an anti-intrusion bar, and combinations thereof, and wherein the internal structural vehicle framework is a unibody internal structural vehicle framework.

19. The vehicle of claim 18, wherein the exterior panel is a door panel.

20. The vehicle of claim 18, wherein the exterior panel is configured to define a passenger compartment of the vehicle.

* * * * *